(12) United States Patent
Patani et al.

(10) Patent No.: US 9,213,676 B2
(45) Date of Patent: Dec. 15, 2015

(54) HARDWARE DEVICE NAME RESOLUTION FOR DETERMINISTIC CONFIGURATION IN A NETWORK APPLIANCE

(75) Inventors: Ritesh H. Patani, Santa Clara, CA (US); Seshu Konduri, San Jose, CA (US); Akhil Shah, Dover, NJ (US); Kamlakar N. Patil, San Jose, CA (US)

(73) Assignee: Dialogic Incorporated, Milpitas, CA (US)

( * ) Notice: Subject to any disclaimer, the term of this patent is extended or adjusted under 35 U.S.C. 154(b) by 188 days.

(21) Appl. No.: 13/364,897

(22) Filed: Feb. 2, 2012

(65) Prior Publication Data
US 2013/0204987 A1    Aug. 8, 2013

(51) Int. Cl.
G06F 15/177    (2006.01)
G06F 13/42    (2006.01)

(52) U.S. Cl.
CPC .......... *G06F 15/177* (2013.01); *G06F 13/4221* (2013.01)

(58) Field of Classification Search
CPC ........................... G06F 15/177; G06F 13/4221
USPC ............. 709/221; 710/104; 711/170; 712/15; 713/100
See application file for complete search history.

(56) References Cited

U.S. PATENT DOCUMENTS

| | | | |
|---|---|---|---|
| 2004/0068589 A1* | 4/2004 | Witkowski et al. | 709/249 |
| 2005/0075135 A1* | 4/2005 | Cromer et al. | 455/558 |
| 2008/0244754 A1* | 10/2008 | Curren | 726/27 |
| 2009/0292794 A1* | 11/2009 | Ding et al. | 709/221 |
| 2010/0268877 A1* | 10/2010 | Resch et al. | 711/114 |
| 2011/0029731 A1* | 2/2011 | Cilfone et al. | 711/114 |
| 2011/0075643 A1* | 3/2011 | Natan et al. | 370/338 |
| 2011/0320952 A1* | 12/2011 | Kataoka | 715/735 |
| 2012/0166868 A1* | 6/2012 | Volvovski et al. | 714/6.22 |

OTHER PUBLICATIONS

Narenda (Narenda, K, [Patch] Use firmware provided index to register a network interface, Sep. 22, 2010, List: linux-netdev, Message-ID: 20100922183137.GA7607 ( ) auslistsprd01 ! us ! dell ! com, http://patchwork.ozlabs.org/patch/65442/mbox/, p. 1-3).*

Athabaska (Athabaska, Dick, How to change the order of the network cards (eth1 <-> eth0) on linux, Jul. 10, 2011, http://unix.stackexchange.com/questions/10254/how-to-change-the-order-of-the-network-cards-eth1-eth0-on-linux, p. 1-4).*

(Continued)

*Primary Examiner* — Brian J Gillis
*Assistant Examiner* — Michael A Keller
(74) *Attorney, Agent, or Firm* — Chapin IP Law, LLC (57) ABSTRACT

Inconsistencies between internal logical names assigned to hardware devices and physical labeling of the hardware device connectors are overcome by reassigning internal logical names in a network appliance hosting the hardware devices. The initial logical names that refer to the hardware devices are read from an operating system, along with hardware addresses for the hardware devices. The relationship between the initial logical names and the hardware device addresses is compared against a desired relationship, as may be provided in a configuration file. Undesired relationships between logical names and hardware devices are reassigned so that the logical names are consistent with the physical labeling for the hardware devices. The reassigned logical names can be committed to system resources to make the reassignment persistent.

33 Claims, 4 Drawing Sheets

(56) References Cited

OTHER PUBLICATIONS

Brockmeier (Brockmeier, Joe, Breaking a few eggs: Fedora 15 changes network device naming, Mon Jan. 24, 2011 12:23pm, http://www.networkworld.com/community/fedora-15-changes-network-device-naming, Open Source Report, pp. 1-9).*

Dell (Dell, Oss/libnetdevname, Aug. 25, 2011, http://linux.dell.com/wiki/index.php/Oss/libnetdevname, pp. 1-3).*

Domsch (Domsch, Matt, Consistent Network Device Naming coming to Fedora 15, Jan. 23, 2011, http://domsch.com/blog/?p=455, domsch.com blog, pp. 1-20).*

Domsch (Domsch, Matt, Consistent Network Device Naming Updates, Feb. 17, 2011, http://domsch.com/blog/?p=480, domsch.com blog, pp. 1-20).*

Fedora (Fedora, Features/ConsistentNetworkDeviceNaming, Apr. 30, 2011, http://fedoraproject.org/wiki/Features/ConsistentNetworkDeviceNaming, pp. 1-2).*

Consistent Network Device Naming in Linux; Narendra K, Version: 0.92, pp. 1-8, Apr. 7, 2011.

Linux Device Naming; Domsch, et al., Dell Power Solutions, pp. 102-105, Feb. 2007.

Linux Enumeration of NICs, Hentosh, et al., Version 4.1, pp. 1-6, Sep. 2009.

* cited by examiner

HARDWARE DEVICE NAME RESOLUTION FOR DETERMINISTIC CONFIGURATION IN A NETWORK APPLIANCE

CROSS REFERENCE TO RELATED APPLICATIONS

Not applicable

STATEMENT REGARDING FEDERALLY SPONSORED RESEARCH OR DEVELOPMENT

Not applicable

FIELD OF THE INVENTION

The present disclosure relates generally to naming conventions for hardware devices, and more specifically to resolving inconsistencies between internal names and physical labels of hardware devices in a network appliance.

BACKGROUND OF THE INVENTION

Network appliances, as discussed herein, are communication devices that can be used to provide networking capability by offering a communication platform, which can be composed of one or more components, that includes hardware to which cabling can be connected to form a network with other devices also connected to the cabling. A network appliance can be implemented to provide specific networking functionality according to a chosen topology or protocol, such as functionality in accordance with implementing an Ethernet network. In general, a network appliance can provide one or more input/output (I/O) connection points that can be used for communications with other devices. Typically, some number of I/O connection points can be network cable receptacles that can permit connection of network cabling to the network appliance to contribute to implementing a network.

Network cable receptacles that can be provided by a network appliance are often physically labeled with identifiers that can indicate a function or characteristic of the network cable receptacle. For example, if the network cable receptacles are used to contribute to implementing an Ethernet network, the associated physical labels may include identifiers such as "Ethxx," where the "xx" portion represents a number that uniquely identifies a given network cable receptacle on the network appliance. Such physical labels can be important as assisting in permitting other Ethernet devices to be properly connected to the network appliance, since persons such as network technicians may look for and expect to see certain physical labels for Ethernet network cable receptacles to which Ethernet network cables are to be connected.

The network appliance also typically includes an operating system (OS), which may be implemented as a so-called "open source" OS, an example of which is a Linux-based OS. Some examples of OS implementations that are each a Linux-based OS include Red Hat Enterprise Linux (RHEL) and Novell/SUSE Linux Enterprise Server (SLES). The OS performs a number of functions with respect to the network appliance, such as, for example, executing program code to locate or discover hardware devices, as well as providing for the configuration or setup of such discovered hardware devices. Such hardware device discovery is typically achieved with commands provided by the OS to certain hardware addresses to prompt a response from each hardware device installed at such hardware addresses.

One type of hardware device that a network appliance may implement and that the OS can discover is a network port. A network port is a hardware device that can be used to implement a network connection between the network appliance and another device connected to the network appliance with a network cable. The network port can be connected to a network cable receptacle, such as is discussed above, and can provide signaling over such a network cable connected to the network cable receptacle to contribute to implementing a network. Upon discovering a network port as a hardware device, the OS can provide a configuration to permit the discovered network port to operate in accordance with an expected behavior. For example, the OS can determine that the discovered network port is an Ethernet network port, and can thus provide a configuration to permit the Ethernet network port to operate in accordance with the Ethernet protocol. As part of providing such a configuration, the OS may provide a unique internal logical name for each discovered network port, so that the OS and other software programs can uniquely refer to the discovered network ports by their respective logical names.

There is no OS convention or standard for associating a specific logical name with a specific hardware device. Typically, in a network appliance, the OS assigns a logical name that depends on the type of hardware device and the order in which the hardware device is discovered relative to other discovered hardware devices. Thus, for a group of network ports in a network appliance, each network port would typically be assigned a logical name in accordance with the order in which the OS discovers and configures each of the network ports. For example, the logical names assigned to a group of Ethernet network ports may take the form "Ethxx," where "xx" represents a unique number for each discovered Ethernet network port, which number is typically assigned in linear increasing order, in accordance with the order of discovery of each Ethernet network port. The order of discovery of hardware devices, such as network ports in a network appliance, may be impacted by the arrangement of the hardware devices in the network appliance, the OS type, OS vendor, OS version, or other factors that can influence the OS in the discovery of hardware devices. Accordingly, it can be difficult to predict the OS discovery order and thus the logical names that will be assigned to given hardware devices.

Figure 1:
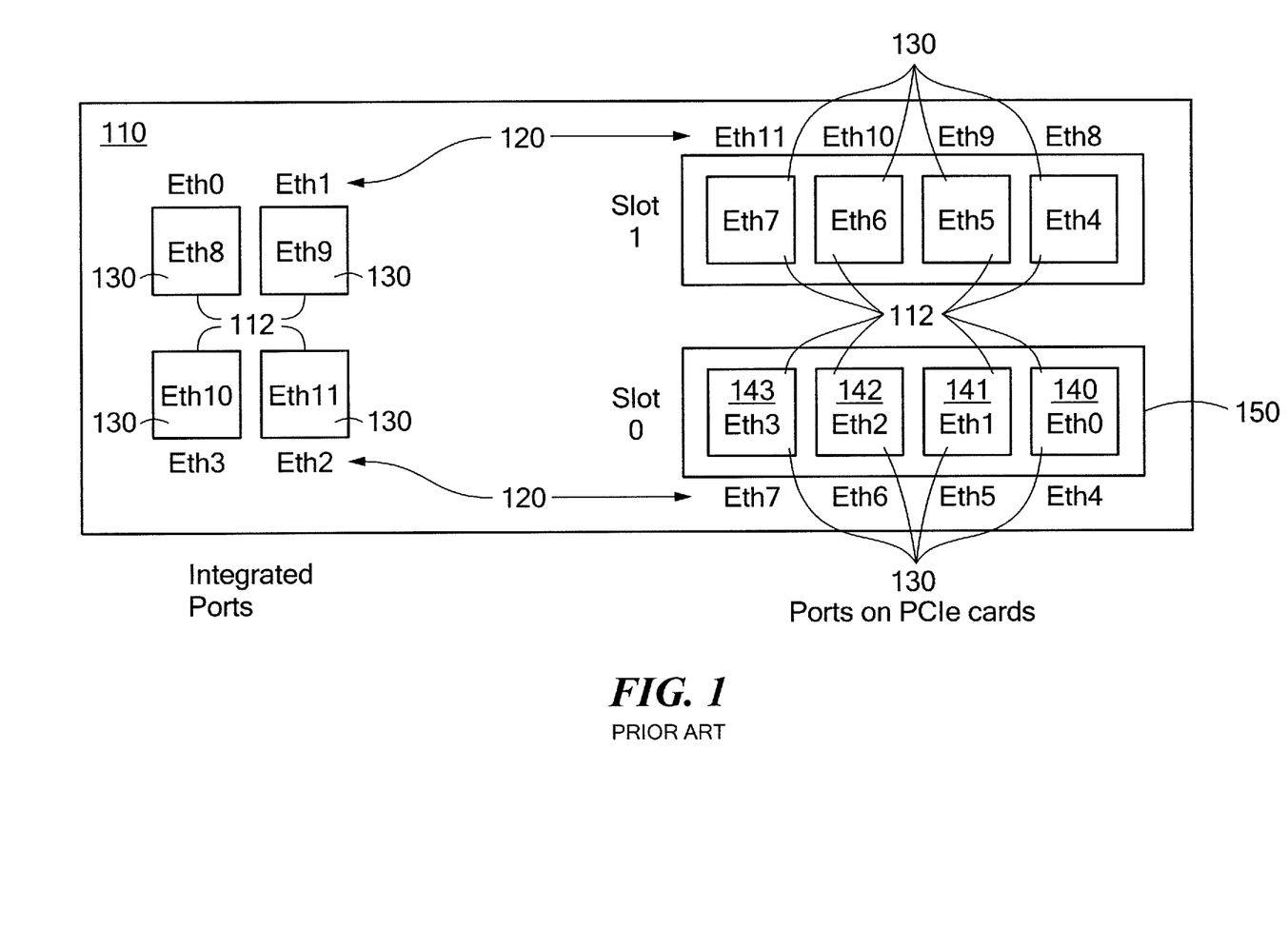
FIG. 1 is a diagram of a portion of a chassis of a network appliance that includes network cable receptacles that are labeled in accordance with a conventional technique.

One drawback associated with the difficulty in predicting the discovery order of hardware devices in a network appliance is that the assigned logical name may not match a physical label for a given hardware device. Some of the issues that may arise with mismatches between assigned logical names and the physical labels associated with hardware devices in a network appliance are discussed with reference to FIG. 1. FIG. 1 illustrates a network appliance chassis portion 110 that provides a number of network cable receptacles 112. Each network cable receptacle 112 is provided with a physical label 120 that describes the expected logical name of a network port (not shown) connected to the respective network cable receptacle 112. Programmers and/or network technicians or other persons responsible for installing and maintaining the network appliance may often expect to depend upon physical labels 120 to indicate a respective logical name for each of the network ports that are connected to respective network cable receptacles 112.

However, as illustrated in FIG. 1, network ports connected to network cable receptacles 112 may be assigned logical names 130 that do not match respective physical labels 120. Such a mismatch or inconsistency in naming convention may typically occur due to the unpredictability of the order of discovery of hardware devices, such as network ports, by the OS in a network appliance, as discussed above. In the example of FIG. 1, a group of network cable receptacles 140, 141, 142 and 143 for Ethernet cable connections have respective physical labels 120 of Eth4, Eth5, Eth6 and Eth7. Network cable receptacles 140-143 are illustrated as belonging to a network interface controller (NIC) PCIe card 150 that occupies a PCIe slot indicated as Slot 0 in FIG. 1. The network ports associated with network cable receptacles 140-143 are the first discovered network ports, are determined to be Ethernet network ports, and are thus assigned respective sequential logical names 130 of Eth0, Eth1, Eth2 and Eth3, which do not match the respective physical labels 120 of Eth4, Eth5, Eth6 and Eth7. Accordingly, programmers and/or network technicians involved in maintaining or installing the network appliance may not be able to rely on the value of a logical name 130 being matched to a physical label 120 for a given network port and associated network cable receptacle 112.

Such a mismatch between assigned logical names 130 and physical labels 120 may result in a programmer and/or network technician being uncertain as to which network port is actually connected to a network cable inserted into a given network cable receptacle 112. In such a situation, the network ports involved in a naming mismatch may thus not operate as expected, which may lead to unpredicted behavior for the network appliance, or may cause the network appliance to appear to malfunction, for example. Network ports are sometimes assigned specific functionality in accordance with physical labels 120, which functionality might depend on the network port capability, physical location or intended usage. For example, two or more network ports with network cable receptacles 112 that are located near each other may be paired for a given task related to redundancy or link aggregation. In addition, the physical location of a given network cable receptacle 112 for a network port may implicate security functionality, such as for administrative or management operations. When the relationship between a logical name 130 and a physical label 120 of a network port is uncertain, the physical arrangement-dependent configurations described above may not function properly.

Some OS facilities may be available to modify the logical names of the hardware devices located by the OS, which modifications may be permitted to persist upon being implemented. These configuration changes may involve manual modification of system configuration files, and may depend upon OS type, OS vendor, OS version, NIC arrangement, NIC vendor or NIC version, for example. Such modifications might be applied to associate each desired network port with a desired logical name that matches a corresponding physical label. However, such modifications may involve a somewhat sophisticated understanding of the network appliance, NIC and/or the OS used to generate the new logical name assignment, so that the task is non-trivial. For example, an administrator making such a change may need to be aware of specific hardware addresses for the hardware device being reconfigured, which hardware addresses may differ among different manufacturers.

In general, it is not desirable to reassign the physical labeling of the hardware devices, such as network ports, to match the logical names of the respective hardware devices. The physical labels are typically fixed in place during manufacturing to resist being removed, while the logical name order can change based on a number of factors, so that even if physical labels are moved, they might not always reflect the desired relationship with a corresponding logical name for associated hardware devices. Accordingly, it is often left to the user of the network appliance to manually configure the logical names assigned by the OS to match those provided by the physical labels. Such a process tends to be complex and time consuming, and also might be repeated, for example, in the event of OS reinstalls or updates or hardware modifications as may occur with the addition, modification or removal of a pertinent hardware device.

Therefore, it would be desirable to permit hardware devices in a network appliance to be configured with logical names to match physical labels associated with the hardware devices to aid in the installation, configuration and/or maintenance of the network appliance.

SUMMARY

In accordance with the present disclosure, a computer implemented method for automatically configuring logical names in a network appliance to correspond to desired physical labels for hardware devices is provided. According to an aspect of the disclosure, the method determines the logical names assigned to certain hardware devices by an operating system (OS) and compares the determined logical names to desired or expected logical names that are established to be consistent with physical labels associated with hardware devices in the network appliance. If the determined logical name assignments do not match the desired logical name assignments, the method queries the hardware configuration of the network appliance, and assigns desired logical names to the hardware devices, in accordance with a predetermined association between hardware configuration of the hardware devices and the desired logical names.

According to an aspect of the disclosure, the hardware devices are network ports, some of which may be integrated with a system board of the network appliance, while others may be provided on plug-in network interface controller (NIC) cards, such as PCIe NIC cards. The hardware addresses for the network ports are read using the OS and/or hardware configuration information that may be provided in configuration files or determined by accessing the network ports.

According to another aspect, configuration files maintained and used by the OS are modified to reflect the desired logical names assigned to desired hardware devices, such as network ports.

According to another aspect, a file containing references to physical labels is provided to the network appliance, the contents of which file can be used to determine whether the assigned logical names are consistent with the physical labeling provided to the hardware devices of interest.

BRIEF DESCRIPTION OF THE SEVERAL VIEWS OF THE DRAWINGS

The present disclosure is described in greater detail below, with reference to the accompanying drawings, in which.

DETAILED DESCRIPTION OF THE INVENTION

In accordance with the present disclosure, methods and systems are provided to establish a beneficially consistent naming convention for hardware devices identified by components of an operating system (OS) operating on a network appliance. More specifically, the present disclosure permits the resolution of inconsistencies between internal logical names and external physical labels associated with hardware devices, such as network ports, in a network appliance.

Systems and methods of the present disclosure are described below in an exemplary embodiment that addresses naming inconsistencies between logical names and physical labels associated with hardware devices in the form of network ports within a network appliance. However, it should be appreciated that the presently disclosed systems and methods are also applicable to address naming inconsistencies between logical names and physical labels of other hardware devices in a network appliance as discussed subsequently.

Figure 2:
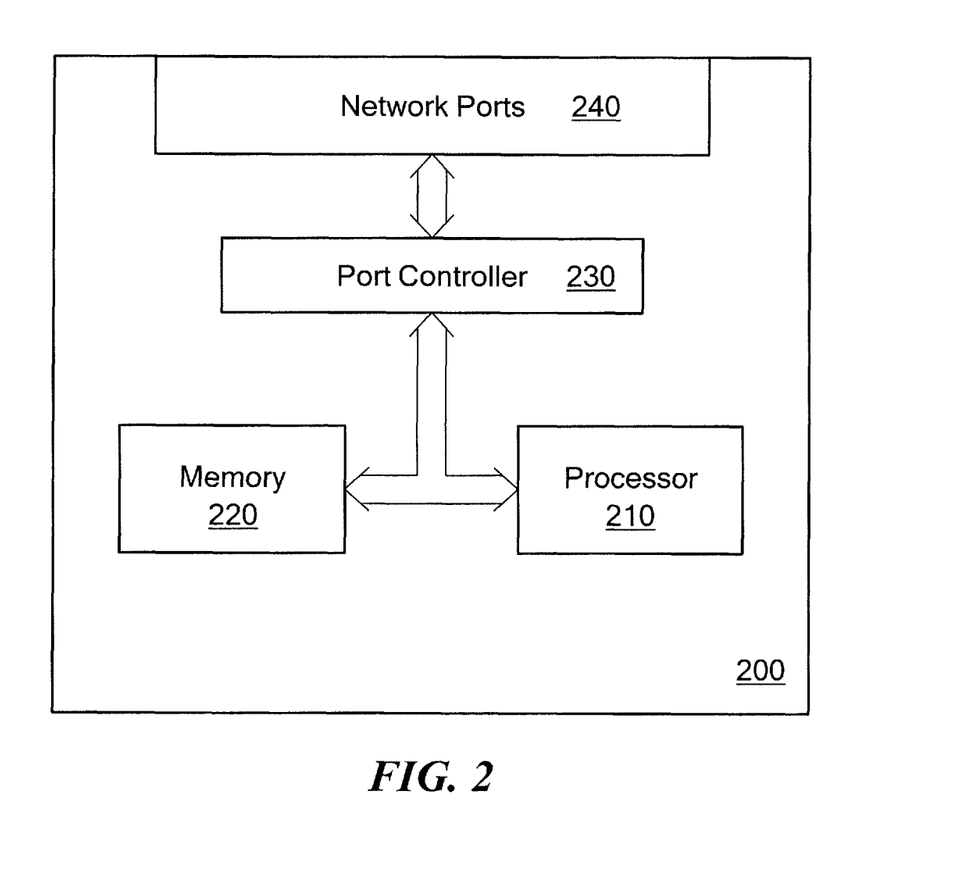
FIG. 2 is a simplified hardware diagram of a network appliance in accordance with the present disclosure.

Referring to FIG. 2, a simplified hardware diagram of a network appliance 200 is illustrated. Network appliance 200 includes a processor 210 and a memory 220 that interact to provide control and communication services for components of network appliance 200. For example, processor 210 can retrieve and execute instructions from memory 220 to implement a software construct, such as an OS (not shown) and/or file management system (not shown). Although not shown in FIG. 2, memory 220 can store application programs, an OS, information involved in communications, and generally any type of information that may be generated or used by network appliance 200. A port controller 230 is coupled to memory 220 and processor 210, and can receive control instructions from processor 210 related to controlling network ports 240. Information that may be sent or received by network ports 240 may be managed by port controller 230, and may be stored in memory 220 under the control of processor 210.

Figure 3:
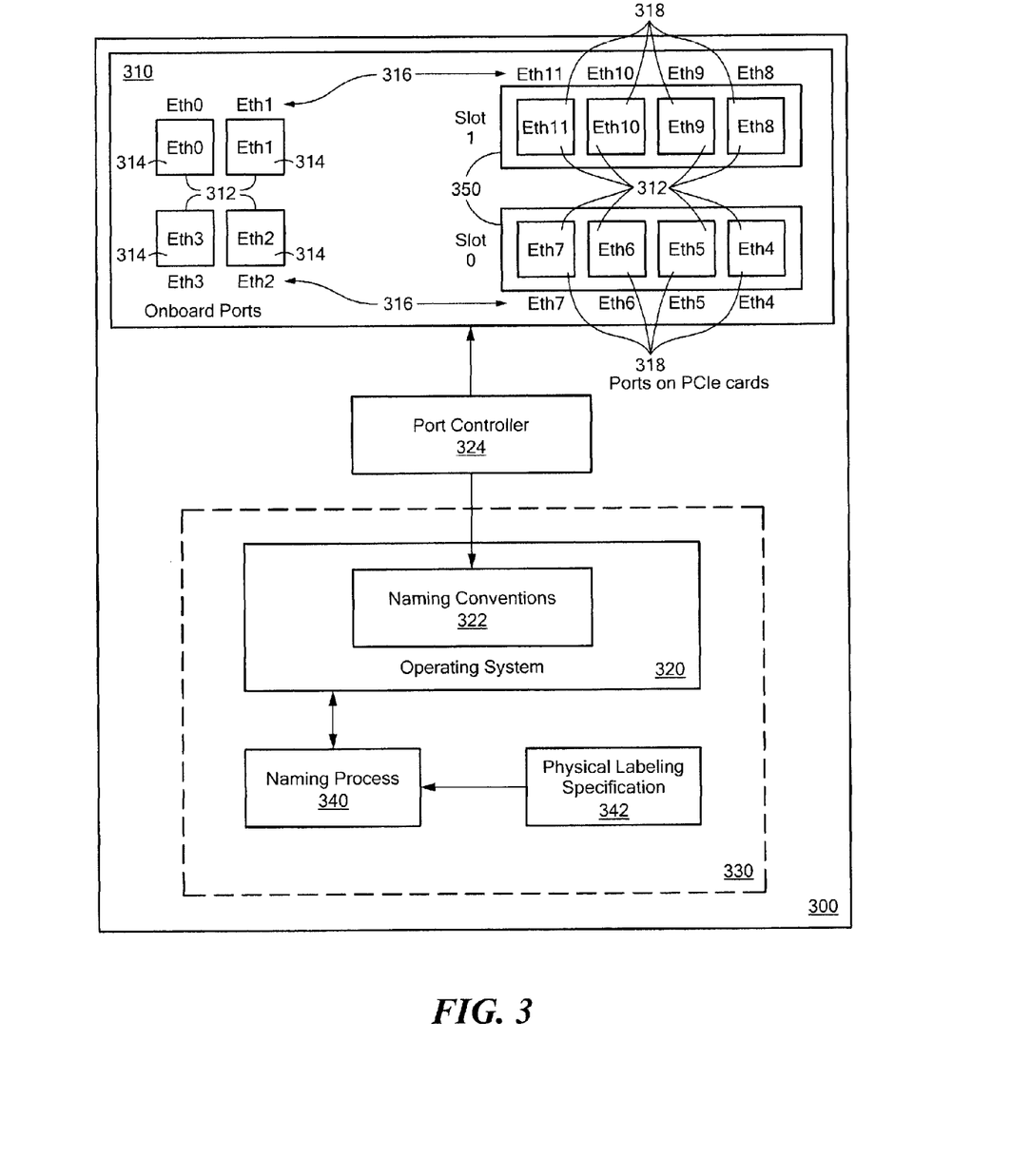
FIG. 3 is a diagram of a network appliance showing hardware and software components that implement or use logical names or physical labels in accordance with an exemplary embodiment of the present disclosure.

Referring now to FIG. 3, a diagram of a network appliance 300 that is implemented in accordance with the present disclosure is illustrated. Network appliance 300 may be implemented as network appliance 200 shown in FIG. 2. Network appliance 300 includes items illustrated as hardware elements, such as network hardware 310, which represents a portion of network appliance 300 that includes network ports (not shown) and externally accessible components. Network hardware 310 may be implemented as network ports 240 illustrated in FIG. 2. Another illustrated hardware element is a port controller 324, which provides a mechanism for communicating information between network hardware 310 and a control portion 330. Port controller 324 may be implemented as port controller 230 illustrated in FIG. 2. Control portion 330 can be implemented as a software construct that can provide processing and control services for controlling port controller 324, which in turn controls network hardware 310. Control portion 330 can be implemented with memory 220 and processor 210 illustrated in FIG. 2.

Network hardware 310 includes physical labels 316 used to identify network connector hardware in the form of network cable receptacles 312. Physical labels 316 include a plurality of identifiers that are intended to match internal logical names that are used to refer to network ports 240 (FIG. 2) that are connected to corresponding network cable receptacles 312. FIG. 3 provides an example in which there are twelve physical labels 316, with identifiers Eth0-Eth11; however, it is understood that the actual number of network cable receptacles 312 and associated physical labels 316 may be greater or less than twelve in accordance with the present disclosure and without undue experimentation.

In accordance with the exemplary embodiment shown in FIG. 3, network hardware 310 includes network cable receptacles 314 that are connected to network ports that are onboard ports or integrated in a system board (not shown) of network appliance 300. Network hardware 310 also includes network cable receptacles 318 that are connected to network ports that are provided on network interface controller (NIC) cards 350 that can be PCIe cards that are installed in PCIe card slots labeled 0 and 1 that permit connection with a PCIe bus (not shown) in network appliance 300. Network cable receptacles 312 can be implemented as Ethernet connectors to provide cable connectivity to a connected network port that can be implemented as an Ethernet network port.

Network cable receptacles 314 are identified with physical labels 316 of Eth0, Eth1, Eth2 and Eth3 are representative of system integrated network ports. Likewise, network cable receptacles 318 are PCIe cards that are physically installed on a system board (not shown) that forms a part of network appliance 300. Thus in FIG. 3, network hardware 310 represents physical connections and locations for hardware that are divided into system integrated network cable receptacles 314 and NIC cards 350 based network cable receptacles 318, each of which are connected to network ports 240 (FIG. 2) that can be used to implement Ethernet network ports.

In FIG. 3, control portion 330 illustrates components of network appliance 300 that can be implemented in software as an architecture that provides processing and control services. Control portion 330 components include OS 320, which can configure and utilize naming conventions 322, and direct the operations of network communications using port controller 324. Naming conventions 322 can represent storage locations in disk files or computer memory for storing internal nomenclature such as logical names used to identify network ports 240 (FIG. 2) to OS 320. Accordingly, naming convention 322 provides logical names for network ports 240, which are each connected to and associated with a respective network cable receptacle 312. In the case of network ports 240 being implemented as Ethernet network ports, the logical names can have designations Eth0-Eth11, which are used by port controller 324 to address specific ones of network ports 240.

When network appliance 300 is initialized, such as by being powered on to load OS 320 from nonvolatile memory storage, or by receiving a new version of OS 320, the hardware devices in network appliance 300 are discovered and configured. As part of this process, OS 320 includes programming instructions to examine various aspects of network hardware 310 that makes up network appliance 300, to permit the hardware to be configured for operation. In some instances, network hardware 310 is configured for operation by installing software drivers (not shown) that receive and execute commands to operate the hardware to which the software driver is assigned. In some circumstances, OS 320 identifies network hardware 310 upon initialization and creates internal identifiers or logical names that are used to refer to the hardware devices. The logical names can be stored in files on disk media, or can be stored in operating system memory or other storage locations that permit OS 320 to refer to those hardware devices identified by the logical names.

OS 320 uses port controller 324 to determine the content and configuration of network hardware 310. Port controller 324, under the direction of OS 320, can help identify hardware devices such as network ports 240 (FIG. 2), typically in accordance with a sequence defined by OS 320. As OS 320 discovers each of the hardware devices in network hardware 310, a logical name is assigned to each discovered hardware device in naming conventions 322. The logical names are typically assigned in accordance with a convention, such as by having a text prefix followed by a number used to specify a particular hardware device in a group of like devices. For example, in the case of Ethernet network ports, the logical names assigned to the ports can take the form "Ethxx," where "xx" represents a number for identifying a specific port. In general, upon initialization, OS 320 assigns logical names in numerical sequence order for like hardware devices, thus resulting in one of the logical names, designated as Eth0-Eth11 in the case of Ethernet network ports, being assigned to one of network ports 240 (FIG. 2). After each of the network ports 240 has been assigned an associated logical name in naming conventions 322, those logical names can be used by OS 320 to refer to individual ones of network ports 240, through commands provided to port controller 324, for example.

Conventionally, the logical names assigned to network ports 240 may not match physical labels 316 that are used to identify network cable receptacles 312 that provide connection access for network ports 240. Such a mismatch typically leads to uncertainty and confusion as to which network port is configured for which network cable receptacle, especially from the viewpoint of a service technician seeking to connect network cables to appropriate network cable receptacles for proper system operation.

In accordance with the present disclosure, a naming process 340 embodies an exemplary method for collecting information on the identification process undertaken by OS 320 and determining the logical names used to refer to network ports 240. Moreover, naming process 340 can determine certain physical network port properties, such as a media access control (MAC) address for a network port implemented as an Ethernet network port. Naming process 340 can also identify PCIe address bus information that OS 320 may obtain and store. Naming process 340 can determine a relationship between the logical names in naming conventions 322 and hardware addresses, such as MAC addresses, for network ports. For example, naming process 340 can obtain hardware addresses for network ports 240, and use such hardware addresses to lookup the associated logical names through queries posed in OS 320. With the originally assigned logical name information, hardware addresses of the network ports and/or PCIe address bus information, naming process 340 can map, or assign, new logical names to each of network ports 240.

In accordance with an exemplary embodiment, a physical labeling specification 342 is provided to network appliance 300 to define a set of desired logical names for network ports 240. Physical labeling specification 342 can provide information about physical labels 316, for example, to permit naming process 340 to establish logical names in naming conventions 322 that directly correspond with physical labels 316. Physical labeling specification 342 can also provide information relating desired logical names to hardware addresses, such as MAC addresses, at which specific hardware devices, such as Ethernet network ports, are installed. For example, physical labeling specification 342 can provide information on hardware device location, such as hardware locations associated with network ports 240 that are to be associated with desired logical names that reflect the arrangement of physical labels 316. Naming process 340 can use the hardware addresses for network ports 240 to lookup desired logical names associated with those hardware addresses within physical labeling specification 342. Naming process 340 can then determine if the already assigned logical names and the desired logical names are inconsistent, and then replace inconsistent already assigned logical names with desired logical names for the associated hardware addresses that correspond to a desired network port 240 for a given desired logical name. Naming process 340 may alternately, or in addition, omit a comparison between already assigned logical names and desired logical names for associated hardware addresses, and directly provide the desired logical names to naming conventions 322 to be associated with hardware addresses to refer to desired network ports 240.

Naming process 340 can construct or replace logical names provided to naming conventions 322, so that OS 320 can refer to the network ports (not shown) in network hardware 310 in accordance with the re-assigned references provided by naming process 340. Accordingly, naming process 340 can modify files or memory in which logical names used by naming conventions 322 are stored, or can modify files or memory used to generate the contents of naming conventions 322 to generate the logical names as desired for referring to network ports 240 (FIG. 2) to be consistent with physical labels 316 provided on network hardware 310. Moreover, naming process 340 can generate the logical names used to refer to network ports 240 in network hardware 310 to be persistent, so that the assigned mapping of logical names survives events such as re-initialization or updates to form OS 320.

Naming process 340 operates to automatically generate the logical names in naming conventions 322 in accordance with physical labeling specification 312, so that naming process 340 can be included in an initialization process to re-establish the desired logical names for network ports 240 in accordance with physical labels 316 in network hardware 310 upon a system re-initialization, restart or operating system update. Naming process 340 may also be invoked as part of a manufacturing process used to create network appliance 300. For example, network appliance 300 may be initialized with OS 320 during manufacture, resulting in logical names being defined for network ports 240 that may not be consistent with or match the arrangement of associated physical labels 316. Naming process 340 may then be employed to reassign logical names in naming conventions 322 in accordance with physical labeling specification 312. Such a logical name reassignment can be made persistent, so that consistent hardware device naming can be provided with network appliance 300 as it is deployed.

Figure 4:
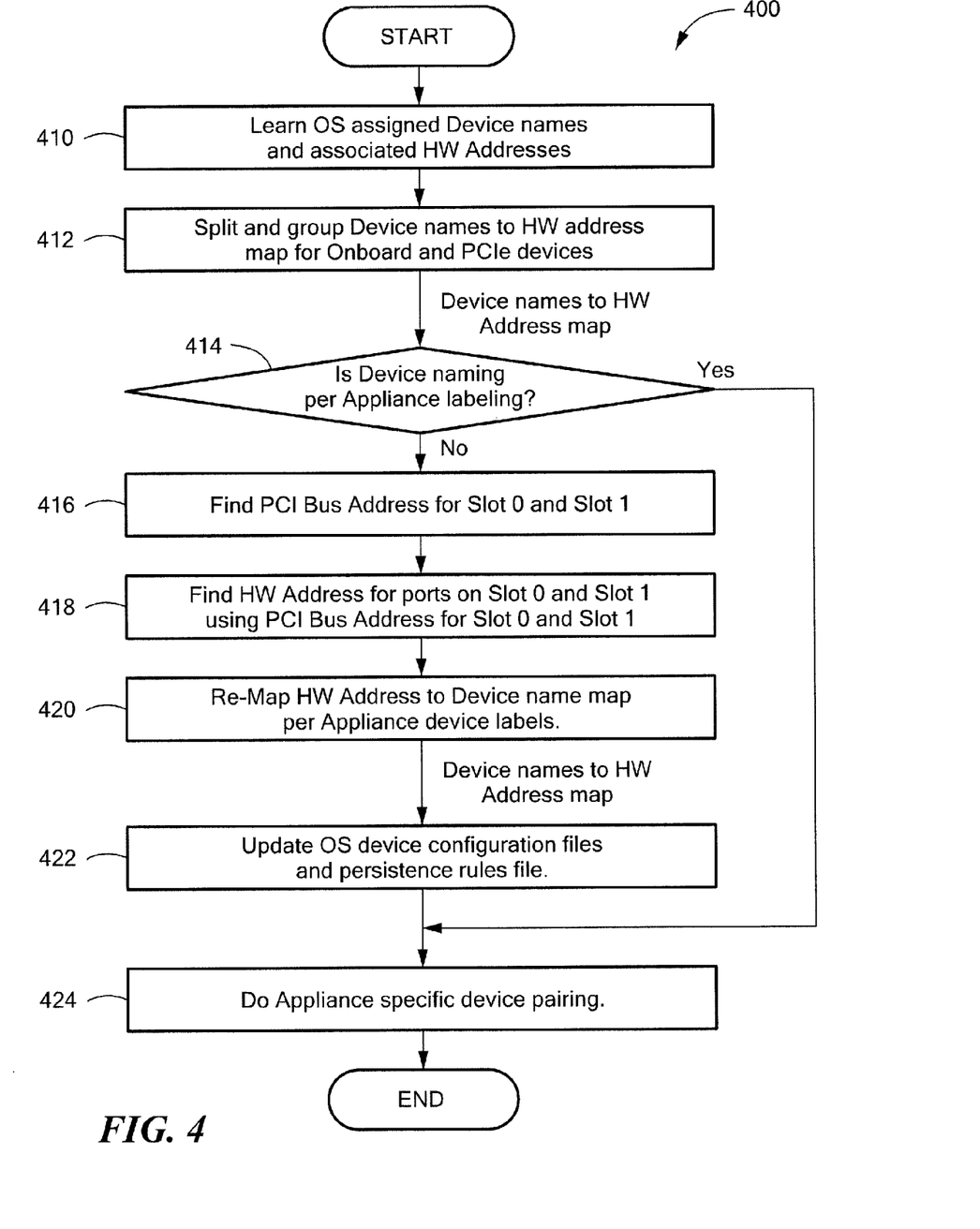
FIG. 4 is a flowchart illustrating a process in accordance with an exemplary embodiment of the present disclosure.

Referring now to FIG. 4, a flowchart 400 illustrates an exemplary embodiment of naming process 340 (FIG. 3) in accordance with the present disclosure. As indicated in block 410, the internal logical names assigned to network ports 240 (FIG. 2) by OS 320 (FIG. 3) are determined. The associated hardware addresses for network ports 240 are also determined. These pieces of information can be determined by reading specific files or memory locations originated or maintained by OS 320 (FIG. 3) when discovering or configuring hardware devices, such as may occur upon initialization of OS 320, for example. The hardware addresses associated with network ports 240 referenced by the logical names can also be determined from files or memory locations originated or maintained by OS 320 as well. Alternately, or in addition, system components, such as various hardware items or memory storage, can be queried to obtain the hardware addresses. Hardware addresses for system integrated hardware devices, such as network ports 240 (FIG. 2) can be determined by examining the hardware configuration of bus-connected components determined by OS 320, or by querying the components themselves, such as by querying properties of network ports 240 and network hardware 310 (FIG. 3). Various OS facilities such as, for example, Ethernet device configuration files or system log files can be used to collect the OS-assigned logical names for the devices, as well as the associated hardware addresses. For example, in the case where OS 320 is implemented as RHEL, naming process 340 (FIG. 3) illustrated in flowchart 400 may inspect device configuration files and system log files such as /var/log/messages* and/or /etc/sysconfig/network-scripts/ifcfg-*, as well as other potentially related files providing configuration information that may be maintained by RHEL.

Once the logical names and associated hardware addresses for the hardware devices, such as network ports 240 (FIG. 2) in network hardware 310 (FIG. 3), are determined, naming process 340 (FIG. 3) illustrated in flowchart 400 can divide and group the logical names with respective hardware addresses for the system integrated and added-on devices, as illustrated in block 412. The logical names and hardware addresses may be grouped according to physical locations in network appliance 300 (FIG. 3), the specific capabilities or design criteria for the hardware devices, and/or the properties of the hardware devices. For example, network ports 240 may be grouped by logical name and hardware address in accordance with whether the devices are system integrated devices, such as is indicated with physical labels 316 (FIG. 3) Eth0-Eth3, or whether the hardware devices belong to a specific add-on NIC card 350 (FIG. 3) such as is shown in slot 0 for Eth4-Eth7 or slot 1 for Eth8-Eth11. The separation and grouping of logical names and hardware addresses can contribute to organizing the hardware devices in accordance with certain goals for setting up or maintaining network appliance 300 (FIG. 3), such as implementing security or administrative provisions.

Naming process 340 (FIG. 3) illustrated in flowchart 400 then makes a determination as to whether the logical names of the devices assigned by OS 320 is in accordance with physical labels 316 as illustrated in network hardware 310 of FIG. 3, for example. If the logical names assigned to network ports 240 (FIG. 2) are consistent with the physical labels 316, naming process 340 (FIG. 3) illustrated in flowchart 400 continues with appliance specific device pairing, as illustrated by the Yes branch being taken out of decision block 414 to block 424. Application specific device pairing refers to the practice of using multiple network connections to implement an application function, such as security or administrative tasks, or can refer to the provision of the features of redundancy or aggregation to an implemented application function. If the logical names do not match physical labels 316, actions are taken to reassign or remap the logical names, as indicated by the No branch being taken out of decision block 414.

The reassignment or remapping of logical names begins with a determination of a PCIe bus address, such as may be acquired for slot 0 and/or slot 1 of network hardware 310 (FIG. 3). Once the PCIe bus address for slot 0 and slot 1 is found, as illustrated in block 416, the hardware addresses for the network ports on NIC cards 350 in slot 0 and slot 1 are determined, using, as illustrated in block 418, the previously determined PCIe (FIG. 3) bus addresses for slot 0 and slot 1. In accordance with an exemplary embodiment, naming process 340 (FIG. 3) illustrated in flowchart 400 can tag the logical names assigned by OS 320 to network ports 240 associated with slot 0 and slot 1, such as network ports 240 that are connected to network cable receptacles 318, for reassignment and/or remapping. The respective network ports in slot 0 and slot 1 are, in this example, located on PCIe cards that are added-on or installed in expansion card receptacles (not shown) provided in hardware 300 (see FIG. 3). The inserted PCIe cards are thus established to be located at hardware positions identified as slot 0 or slot 1, which identification can be used for physically referencing the network ports located on each of the inserted PCIe cards.

Once the hardware addresses for the network ports are determined, as illustrated in block 418, naming process 340 (FIG. 3) illustrated in flowchart 400 remaps the hardware addresses to desired logical names that are consistent with physical labels 316 illustrated as Eth0-Eth11 in network appliance 300. The step of remapping hardware addresses to desired logical names is illustrated in block 420. According to an exemplary embodiment, an OS facility can be used to identify the PCIe bus addresses for NIC cards in slot 0 and slot 1 of network hardware 310 (FIG. 3). For example, in the case of an OS implemented in accordance with RHEL, an OS facility such as "lspci" can be used to list the PCIe address bus information as well as the device information associated with addresses on the PCIe bus.

Although discovery of hardware devices in slots 0 and/or 1 may occur in any particular order, some OS implementations may cause hardware devices in slot 1 to be discovered and configured before those in slot 0. In such an instance, slot 1 may be assigned a bus address that is lower in value than that of slot 0. Thus, for example, the bus address for a NIC card 350 located in slot 0 may be higher in value than that for a NIC card 350 located in slot 1. The respective bus addresses are used to identify the respective hardware addresses for hardware devices respectively located in slot 0 and slot 1. These identified hardware addresses can then be used to identify the logical names associated with the hardware devices located in respective slots 0 and 1. Logical names may then be reassigned to the hardware devices located in respective slots 0 and 1, based on, for example, device enumeration offsets used in conjunction with the bus address respectively assigned to slot 0 and slot 1. Thus, hardware devices in slot 0 may be provided with logical names, e.g., Eth4, Eth5 . . . Eth7, that are sequentially prior to the logical names assigned to hardware devices in slot 1, e.g., Eth8, Eth9, . . . Eth11, even though slot 1 may have a bus address that is lower in value than slot 0.

The PCIe bus address information that can be determined from OS facilities can be used to identify the hardware addresses associated with network ports 240 (FIG. 2) located in respective slots 0 and 1. The hardware addresses for the hardware devices in slot 0 and slot 1 can be used to identify the logical names assigned to those hardware addresses. In the case of system integrated network ports 240 associated with physical labels 316 designated as Eth0-Eth3, as illustrated in network hardware 310 of FIG. 3, the logical names and hardware address relationship is reordered and a new logical name is assigned to respective ones of network ports 240 in accordance with physical labels 316 and appliance requirements. In an exemplary embodiment of the present disclosure, the logical names are assigned to the appropriate device using device enumeration offset that is applicable for use with system integrated network ports 240 connected to network cable receptacles 314. For example, naming process 340 (FIG. 3) may determine a base hardware address for a network port 240 with a logical name of Eth0 in the operations indicated in block 412. The base hardware address may then be used to refer to the hardware addresses for network ports 240 with logical names of Eth1-Eth3 by using device enumeration offsets combined with the base hardware address for network port 240 with the logical name of Eth0. With the determination of the relationship between the logical names and the hardware addresses, the logical names can be remapped in accordance with physical labels 316 of network appliance 310 using, for example, the settings provided in physical labeling specification 342.

According to an exemplary embodiment of the present disclosure, physical labeling specification 342 specifies a relationship or association between desired logical names and hardware addresses that are each identified with one of physical labels 316. Naming process 340 matches the hardware addresses specified in physical labeling specification 342 with the hardware addresses for network ports 240 that were determined by naming process 340, as illustrated in block 418. Each desired logical name associated with a hardware address specified in physical labeling specification 342 is then assigned as the logical name for the matched hardware address in network appliance 300. Thus, naming process 340 uses an association between logical names and hardware addresses in a specification as may be provided by physical labeling specification 342 to determine the logical name to assign to a hardware device such as a network port 240. The specified association between logical names and hardware addresses is configured so that each hardware address is defined as being associated with one of physical labels 316.

Once the logical names are remapped or reassigned to the hardware address locations as desired, as illustrated in block 420, naming process 340 (FIG. 3) illustrated in flowchart 400 causes the OS facilities to be updated with the new mappings between the desired logical names and associated device hardware addresses, as illustrated in block 422. For example, OS facilities may be employed to update Ethernet device configuration files maintained by OS 320. Some configuration files may include "udev" persistent rules, which are modified with the new mappings and assignments between the desired logical names and associated hardware addresses. These persistent rules can preserve the new mappings and assignments between logical names and hardware addresses, even with the occurrence of certain events such as system restart or initialization, or OS upgrade.

Once the relationship between desired logical names and hardware addresses associated with physical labels 316 is established or verified, naming process 340 (FIG. 3) illustrated in flowchart 400 continues with operations to configure network device pairing or to provide other configuration settings for network deployment to achieve desired network operation, as is illustrated in block 424. The device pairing can be a logical based construct for aggregating network traffic over several network cables with the grouping or pairing of certain network devices or ports. Such logical constructs may also be employed to establish or improve security redundancy for network communications, for example.

By establishing a consistent reference between physical labeling and internal logical naming, network appliance 300 can provide deterministic operation that is consistent with service technician expectations for setting up network appliances and network cabling. The present disclosure obtains these benefits with newly manufactured systems, as well as with legacy systems that have an installation and operation history. The benefits of the subject matter of the present disclosure can also be attained with system reconfiguration, as may occur with the insertion of NIC cards into a network appliance, or with the installation or upgrade of an OS, since the disclosed processes, such as naming process 340 (FIG. 3) can be executed on system restart or reconfiguration to establish consistent naming practices between logical names and physical labeling. In addition, the present disclosure provides for persistency of the generated mapping or assignment between logical names and hardware devices associated with a physical label.

The operations herein depicted and/or described herein are purely exemplary and imply no particular order. Further, the operations can be used in any sequence when appropriate and can be partially used. With the above embodiments in mind, it should be understood that they can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations depicted and/or described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed systems and methods can also be embodied as computer readable code on a computer readable medium. The computer readable medium is any data storage device that can store data, which can be thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of this disclosure. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the function described herein may be performed by a processor executing program instructions out of a memory or other storage device. Therefore, it is the object of the appended claims to cover all such variations and modifications as come within the true spirit and scope of the disclosure.

What is claimed is:

1. A computer implemented method of reassigning relationships between a plurality of internal identifiers and a plurality of hardware addresses of network ports in a network appliance, the method comprising:

determining a value for each of a plurality of internal identifiers, each determined internal identifier referring to one of a plurality of hardware addresses of network ports in a network appliance, at least one network device being installable at each hardware address, the at least one network device including at least one added-on device for the network appliance;

determining the hardware address referred to by each determined internal identifier; and for each hardware address at which the at least one added-on device for the network appliance is installable:

determining, in accordance with a relationship specification, a value for a desired internal identifier that refers to the hardware address, the relationship specification describing relationships between a plurality of desired internal identifiers and the respective hardware addresses at which the at least one added-on device is installable, the relationships described by the relationship specification providing a mapping between the plurality of desired internal identifiers and the respective hardware addresses at which the at least one added-on device is installable;

determining, in accordance with the relationship specification, when the value for the determined internal identifier that refers to the hardware address matches the value for the desired internal identifier that refers to the hardware address; and in the absence of a match, setting the value for the determined internal identifier to the value for the desired internal identifier in accordance with the mapping provided by the relationship specification.

2. The method according to claim 1, further comprising: storing the value for the desired internal identifier with an operating system implemented on the network appliance.

3. The method according to claim 2, further comprising: storing the value for the desired internal identifier to be persistent with the operating system.

4. The method according to claim 1, wherein the network ports are Ethernet network ports.

5. The method according to claim 4, further comprising: setting values for the plurality of desired internal identifiers based on a sequence in accordance with the form Ethxx, where xx represents sequential numbering.

6. The method according to claim 1, further comprising: determining a bus address associated with at least some of the network ports.

7. The method according to claim 6, further comprising: determining the hardware addresses of the at least some of the network ports based on the bus address.

8. The method according to claim 1, further comprising: inspecting one or more of a configuration file or a log file accessible to an operating system implemented on the network appliance to determine one or more of the value for each of the desired internal identifiers or the hardware address of each of the network ports.

9. The method according to claim 1, further comprising: accessing the relationship specification by retrieving information stored on the network appliance.

10. The method according to claim 1, further comprising: providing the relationships between the plurality of desired internal identifiers and the respective hardware addresses in accordance with physical labels designating each of the network ports in the network appliance.

11. A network appliance comprising a processor and a memory, the processor being operative to retrieve and execute instructions from the memory to implement the method in accordance with claim 1.

12. The method according to claim 1, further comprising: for each of the hardware addresses, performing a lookup query on the relationship specification using the respective hardware address to obtain the value for the desired internal identifier that refers to the respective hardware address.

13. The method according to claim 1, wherein the determining of the hardware address includes determining a media access control (MAC) address at which the at least one added-on device for the network appliance is installable.

14. The method according to claim 1, wherein each network port is associated with a physical label in the network appliance, and wherein the method further comprises:

for each hardware address of the network port at which the at least one added-on device for the network appliance is installable, determining when the physical label associated with the network port matches the determined internal identifier that refers to the hardware address.

15. The method according to claim 14, further comprising: in the absence of a match between the physical label associated with the network port and the determined internal identifier that refers to the hardware address, remapping the hardware address of the network port to a respective desired internal identifier that matches the physical label associated with the network port.

16. The method according to claim 1, wherein each network port is associated with a respective one of a sequence of physical labels in the network appliance, wherein the sequence of physical labels includes at least a zeroth (0th) physical label and a first (1st) physical label, and wherein the determining of the hardware address referred to by each determined internal identifier includes determining a base hardware address of the network port associated with the 0th physical label in the sequence of physical labels.

17. The method according to claim 16, wherein the method further comprises:

determining when the 0th physical label matches the determined internal identifier that refers to the base hardware address; and in the absence of a match between the 0th physical label and the determined internal identifier that refers to the base hardware address, remapping the base hardware address to a respective desired internal identifier that matches the 0th physical label.

18. The method according to claim 16, wherein the determining of the hardware address referred to by each determined internal identifier further includes determining a first hardware address of the network port associated with the 1st physical label in the sequence of physical labels.

19. The method according to claim 18, wherein the method further comprises:

determining when the 1st physical label matches the determined internal identifier that refers to the first hardware address; and in the absence of a match between the 1st physical label and the determined internal identifier that refers to the first hardware address, remapping the first hardware address to a respective desired internal identifier that matches the 1st physical label.

20. The method according to claim 18, wherein the determining of the first hardware address includes determining the first hardware address using a predetermined device enumeration offset combined with the base hardware address.

21. A computer implemented method of designating internal identifiers to refer to network ports in a network appliance, comprising:

obtaining, for each of the network ports, a hardware address at which at least one network device is installable, the at least one network device including at least one added-on device for the network appliance;

determining, in accordance with a relationship specification, a value for each of a plurality of internal identifiers, each determined internal identifier referring to the hardware address of a respective one of the network ports, the relationship specification describing relationships between the plurality of internal identifiers and respective hardware addresses at which the at least one added-on device is installable, the relationships described by the relationship specification providing a mapping between the plurality of internal identifiers and the respective hardware addresses at which the at least one added-on device is installable; and for each hardware address at which the at least one added-on device for the network appliance is installable:

determining a value for a desired internal identifier that refers to the hardware address; and in the absence of a match between the value for the desired internal identifier and the value for the determined internal identifier that refers to the hardware address, assigning the value for the desired internal identifier to the determined internal identifier that refers to the hardware address in accordance with the mapping provided by the relationship specification.

22. The method according to claim 21, further comprising: storing the value for the desired internal identifier with an operating system implemented on the network appliance.

23. The method according to claim 22, further comprising: storing the value for the desired internal identifier value to be persistent with the operating system.

24. The method according to claim 21, wherein the network ports are Ethernet network ports.

25. The method according to claim 24, wherein values for the desired internal identifiers are of the form Ethxx, where xx represents sequential numbering.

26. The method according to claim 21, further comprising: determining a bus address associated with at least some of the network ports.

27. The method according to claim 26, further comprising: determining the hardware addresses of the at least some of the network ports based on the bus address.

28. The method according to claim 21, further comprising: accessing one or more of a configuration file or a log file accessible to an operating system implemented on the network appliance to obtain the hardware address of each of the network ports.

29. The method according to claim 21, further comprising: for each hardware address at which the at least one added-on device for the network appliance is installable, accessing a storage on the network appliance to determine the value of the desired internal identifier that refers to the hardware address.

30. The method according to claim 21, further comprising: for each hardware address at which the at least one added-on device for the network appliance is installable, determining the value for the desired internal identifier value that refers to the hardware address in accordance with physical labels designating each of the network ports in the network appliance.

31. A network appliance comprising a processor and a memory, the processor being operative to retrieve and execute instructions from the memory to implement the method in accordance with claim 21.

32. The method according to claim 21, wherein the obtaining of the hardware address includes obtaining, for each of the at least one added-on device for the network appliance, a media access control (MAC) address at which the at least one added-on device is installable.

33. A computer implemented method of reassigning relationships between a plurality of internal identifiers and a plurality of hardware addresses of network ports in a network appliance, the method comprising:
determining a value for each of a plurality of internal identifiers, each determined internal identifier referring to one of a plurality of hardware addresses of network ports in a network appliance, at least one network device being installable at each hardware address, each network port being associated with a physical label in the network appliance;
determining the hardware address referred to by each determined internal identifier; and
for each hardware address of a network port at which the at least one network device is installable:
determining, in accordance with a relationship specification, a value for a desired internal identifier that refers to the hardware address, the relationship specification providing a mapping between a plurality of desired internal identifiers and the respective hardware addresses at which the at least one network device is installable;
determining when the physical label associated with the network port matches the determined internal identifier that refers to the hardware address; and
in the absence of a match between the physical label associated with the network port and the determined internal identifier that refers to the hardware address, remapping the hardware address of the network port to a respective desired internal identifier that matches the physical label associated with the network port in accordance with the mapping provided by the relationship specification.

* * * * *